G. S. LEWIS.
APPARATUS FOR STACKING ENVELOPS, &c.
APPLICATION FILED JUNE 1, 1911.
1,019,059.
Patented Mar. 5, 1912.
2 SHEETS—SHEET 2.
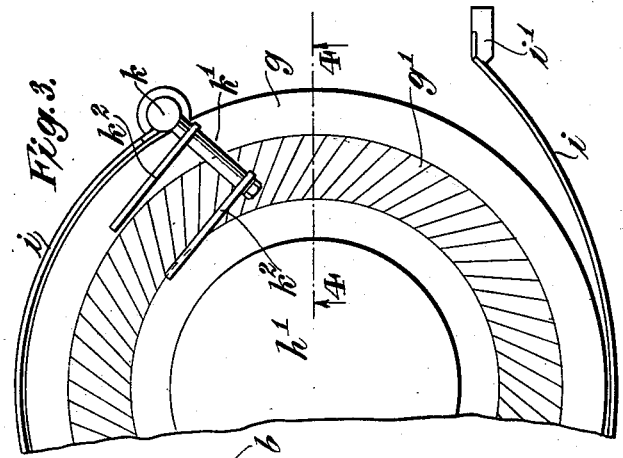
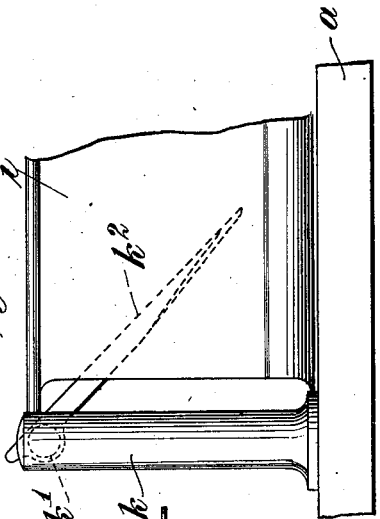
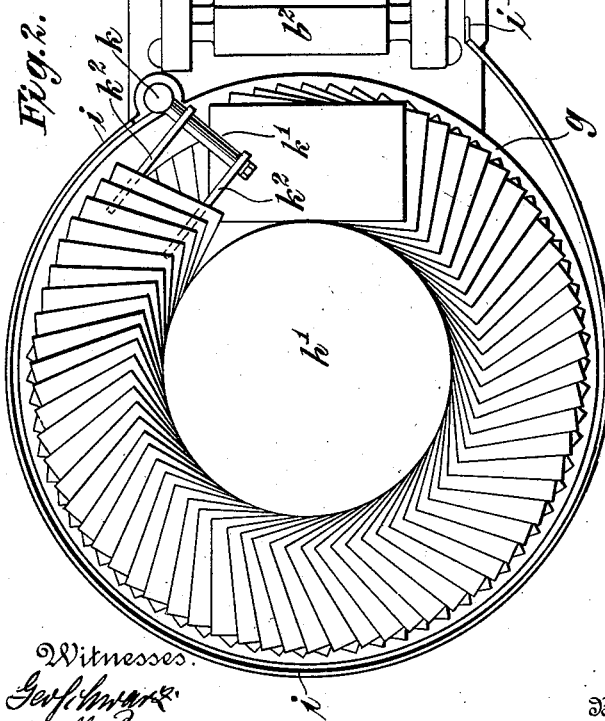
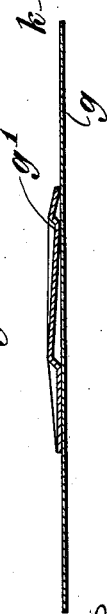
Witnesses.
Inventor
George S. Lewis
By his Attorneys
Redding, Greeley & Austin

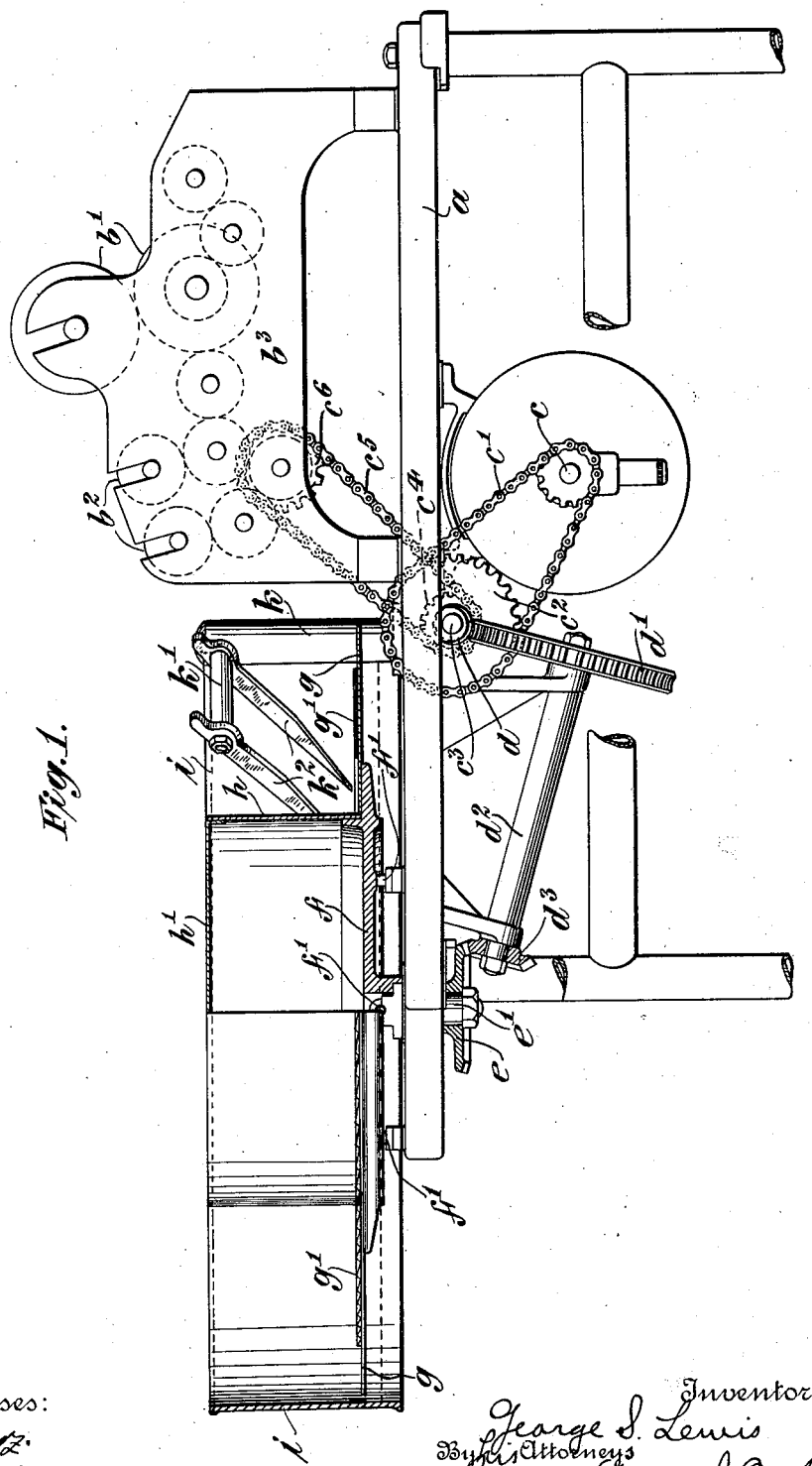

UNITED STATES PATENT OFFICE.

GEORGE S. LEWIS, OF CHICOPEE FALLS, MASSACHUSETTS, ASSIGNOR TO J. STEVENS ARMS & TOOL CO., OF CHICOPEE FALLS, MASSACHUSETTS, A CORPORATION OF MASSACHUSETTS.

APPARATUS FOR STACKING ENVELOPS, &c.

1,019,059.     Specification of Letters Patent.     Patented Mar. 5, 1912.

Application filed June 1, 1911. Serial No. 630,732.

*To all whom it may concern:*

Be it known that I, GEORGE S. LEWIS, a citizen of the United States, residing at Chicopee Falls, in the State of Massachusetts, have invented certain new and useful Improvements in Apparatus for Stacking Envelops, &c., of which the following is a specification, reference being had to the accompanying drawings, forming a part hereof.

In the application of Charles A. Burr, Ser. No. 452,707, there is shown and described a machine for sealing envelops. In the practical operation of that machine it has been found that the possible speed of satisfactory operation is so great as to make the disposal of the sealed envelops a somewhat serious problem. Should they be delivered into an ordinary receptacle, much time would be lost in facing and stacking them. It becomes desirable, therefore, to provide a mechanism which shall receive the sealed envelops from the sealing machine as rapidly as they are delivered, keep them faced, have a sufficient capacity to receive a large number without occupying an undue amount of space, and permit them to be removed by the attendant from time to time, in large or small quantities, without causing the operation of the sealing machine or the delivery of envelops therefrom to be interrupted.

The present invention, therefore, has for its object to provide a stacking apparatus which shall meet the requirements of the particular use referred to, although it is obvious that the invention is not limited to that particular use, since the stacking apparatus is capable of use wherever envelops or cards or other things of similar shape are to be received from a source of supply and stacked.

In accordance with the invention there is provided an endless traveling receiver upon which the envelops are delivered, such receiver being preferably arranged in the form of an annular plate rotating about its own axis and upon which the envelops are laid, each overlapping the next, while a suitable guide, located at a convenient point, raises the envelops from their nearly horizontal position into a nearly vertical position in readiness to be removed by the attendant.

The invention will be more fully explained hereinafter with reference to the accompanying drawings in which it is illustrated and in which—

Figure 1 is a view partly in side elevation and partly in vertical section showing an envelop sealing machine, of the character of that previously referred to, and a stacking apparatus mounted on the same frame. Fig. 2 is a top view of the parts shown in Fig. 1, on a somewhat smaller scale, with a portion of the envelop sealing machine broken away, the stacker being charged with envelops. Fig. 3 is a partial top view of the stacker shown in Fig. 2, without envelops thereon. Fig. 4 is a detail view in section on the plane indicated by the line 4—4 of Fig. 3, but on a somewhat larger scale. Fig. 5 is a partial view of the stacker in elevation, on a larger scale than that of Figs. 2 and 3, showing particularly the support for the guide by which the envelops are raised to a nearly vertical position and the adjacent end of the outer guard plate.

In the embodiment of the invention represented in Fig. 1 the envelop sealing machine and the stacker are shown as mounted upon a common supporting frame $a$. The envelop sealing machine shown in the drawings comprises, briefly, a receptacle $b$ in which the envelops to be sealed are placed, feed and moistening rolls $b'$, into the grasp of which the flap of the lowermost envelop in the receptacle is turned forward by a finger, not shown, and pressing rolls $b^2$, by which the sealed envelops are delivered. The machine is shown as driven from a main driving shaft $c$ through a chain $c'$, a chain wheel $c^2$ on a shaft $c^3$, a pinion $c^4$, a chain $c^5$ and a pinion $c^6$. The shaft $c^3$ is shown as having a worm $d$ which meshes with a worm wheel $d'$, on a shaft $d^2$ which is mounted on the supporting frame $a$ and carries a bevel gear $d^3$. The latter meshes with a bevel gear $e$ on a vertical shaft $e'$ which is mounted in suitable bearings in the frame and carries the stacker, now to be described.

The stacker shown in the drawings comprises a disk $f$ which is secured centrally to the vertical shaft $e'$ and is supported upon rollers $f'$. Secured to the disk $f$ is an annular plate $g$, which may have upon it a corrugated floor $g'$, but has a continuous surface, that is, a surface without partitions and adapted to receive the envelops in a substantially horizontal position, each overlapping the next one before it. Also secured to the disk $f$ is an inner, circumferential guard plate $h$, the top of the well formed thereby preferably being closed by a cap $h'$. Outside of the annular plate $g$ is an outer, circumferential guard plate $i$, one end of which may be secured to a post $i'$ on the frame $a$, adjacent to the frame $b^3$ of the sealing machine, while the other end is secured to a post $k$ on the frame $a$, adjacent to the other side of the frame $b^3$ of the sealing machine. To the post $k$, near its upper end, is secured a horizontal arm $k'$ which has affixed thereto fingers $k^2$, inclined downward toward the annular plate $g$, in a direction opposite to the movement of said plate, and terminating close to the plate to form a guide by which the envelops, shown in Fig. 2, are raised toward a vertical position, so that they shall stand nearly on edge, close together, in readiness to be removed by the attendant.

In the operation of the apparatus, the endless receiver or annular plate is set in motion and the envelops, delivered by the sealing machine, are received thereon, each overlying the preceding envelop but slightly behind it. As the movement of the endless receiver continues its entire surface becomes covered with the envelops until the first one placed upon it reaches the guide $k^2$. As the movement of the receiver continues, the envelops are turned upward from their horizontal position until they stand more nearly upright. The resistance of the entire series of envelops on the receiver may be sufficient to cause them to be raised by the guide in the manner described, but it is preferable to provide the receiver with the corrugated or grooved floor $g'$, as shown, to engage the envelops and push them forward as they approach the guide. The corrugations or grooves are preferably formed at an angle about as shown in Fig. 3 of the drawings, so that while they are substantially parallel with the edges of the envelops, a short distance away from the guide, they are inclined with respect thereto at the foot of the guide and therefore slip under the envelops without tending to drag them forward under the guide. The speed of travel of the endless receiver or annular plate is proportionate to the speed of the sealing machine and the number of envelops which it is capable of receiving is so great that the operator has ample opportunity to remove the envelops adjacent to the guide without interfering with the continuous operation of the sealing machine.

The form of the apparatus shown in the drawings is preferred for coöperation with a sealing machine of the character of that shown, but it is obvious that the form as well as the details of construction might be varied to suit different conditions of use without departing from the spirit of the invention, which is not limited to the precise construction shown.

I claim as my invention:

1. A stacking apparatus for envelops, &c., comprising an endless traveling receiver upon which the envelops are delivered one by one in a substantially horizontal position and from which they may be removed at a point remote from that at which they are delivered to the receiver, and a stationary inclined guide at a point remote from that at which the envelops are delivered and by which the envelops are turned upward from a horizontal position as the movement of the receiver continues.

2. An apparatus for stacking envelops, &c., comprising an annular, horizontally rotating plate upon which the envelops may be delivered one by one in a substantially horizontal and from which they may be removed at a point remote from the point of delivery, and a stationary inclined guide at a point remote from the point of delivery and by which the envelops are turned up from a horizontal position as the movement of the plate continues.

3. An apparatus for stacking envelops, &c., comprising an annular, horizontally rotating plate upon which the envelops may be delivered one by one in a substantially horizontal position and from which they may be removed at a point remote from the point of delivery, said plate having a floor grooved at an angle to the radius, and a stationary inclined guide against which the envelops are pushed in the continued movement of the plate and are turned upward thereby from the horizontal position.

4. The combination with means for delivering envelops in rapid succession, of an envelop stacker, comprising an annular, horizontally rotating plate having a continuous surface upon which the envelops are delivered one by one in a substantially horizontal position from said means and from which they may be removed at a point remote from the point of delivery, and a stationary inclined guide located at a point in the direction of travel of the plate remote from the point of delivery of the envelops to the plate.

This specification signed and witnessed this 29th day of May, A. D. 1911.

GEORGE S. LEWIS.

Signed in the presence of—
T. L. HOPKINS,
W. D. BLOOD.